United States Patent Office 2,744,836
Patented May 8, 1956

2,744,836

PROCESS FOR COATING LEATHER

Rudolf Schubert, Ludwigshafen (Rhine), and Gerhard Otto, Mannheim, Germany, assignors to Badische Anilin- & Soda-Fabrik Aktiengesellschaft, Ludwigshafen (Rhine), Germany No Drawing. Application June 13, 1952,
Serial No. 293,440

Claims priority, application Germany July 11, 1951

4 Claims. (Cl. 117—142)

This invention relates to a process for coating leather with a solution of an ammonium salt of a carboxyl group containing polymer of an acrylic ester.

It is already known to coat fibrous material, such as textile material, leather, artificial leather, paper, cardboard or wood by the employment of aqueous solutions of ammonium salts of carboxyl group-containing interpolymers of acrylic acid or methacrylic acid esters. The coatings prepared with these solutions on leather can only be polished by buffing when interpolymers of methacrylic acid esters and methacrylic acid which contain softeners are employed. The softener content of such coatings, however, impairs the capacity for being stored of the coated leather.

We have now found that solutions of ammonium salts of carboxyl group-containing polymers of acrylic acid or methacrylic acid esters in mixtures of water and organic solvents miscible with water constitute excellent coating agents for leather. The coatings prepared with these solutions may be polished very well by buffing.

The ammonium salts of interpolymers of acrylic or methacrylic acid esters with acrylic or methacrylic acid are especially suitable for the process; interpolymers of these esters with other polymerizable organic acids, as for example maleic acid or crotonic acid, may however also be employed. Ethyl alcohol is especially useful as the alcoholic component of the esters, but other lower alcohols, such as methyl, proply or butyl alcohol, may be used. The interpolymers should contain preferably a fraction of 5 to 35% the carboxyl groups of which are not esterified.

Suitable organic solvents miscible with water are preferably methyl or ethyl alcohol, further proply alcohol, acetone or tetrahydrofurane. The solvent mixture should preferably contain about 60 to 150 parts of an organic solvent miscible with water for each 100 parts of polymer. The water content of the colloidal solutions may be varied within wide limits.

For the preparation of the colloidal solutions, for example, the polymerization may be carried out in the mixture of water and an organic solvent miscible with water, or the requisite amount of the organic solvent may be subsequently added to aqueous solutions or dispersions of the interpolymers. The coating agents may be used uncolored or with organic dyestuffs or pigments. In addition to the fact that the covering layers produced with these coating agents are capable of being buff-polished, as above mentioned, they are also characterized by especially good tenacity and good, durable elasticity.

The new coating agents may also be employed together with aqueous solutions of other colloids, as for example casein, albumin, pectin and the like, or the commercial body colors, which as a rule are prepared on the basis of casein, shellac and carnauba wax, may be added thereto. It is also possible to work drying oils into the coating agents, whereby the properties of the coating can be still further improved. As a rule the coating agents are worked up without the addition of softeners. Only when the solutions of these interpolymers are used in combination with casein body colors is it preferable to add softeners, such as sulfonated castor oil.

With the new coating agents it is also possible to prepare covering layers on leather which has already been provided with a coating on the basis of the known water soluble or water-dilutable leather body colors. The coating agents are suitable for application to leather of the most varied kinds, as for example box calf, kid, neat's box, portfolio leather, leather for clothing and the like.

The following examples will further illustrate this invention but the invention is not restricted to these examples. The parts are by weight.

Example 1

40 parts of iron oxide red and 100 parts of water are added to a solution of 100 parts of the ammonium salt of an interpolymer of 80 parts of acrylic acid ethyl ester and 20 parts of acrylic acid in 100 parts of ethyl alcohol and 100 parts of water, the whole passed twice through a funnel mill for the purpose of homogenisation and then diluted with about 450 parts of water. A body color is obtained which can be buff-polished after application to grain leather and which has a very good adhesive strength.

Example 2

400 parts of a solution consisting of 120 parts of the ammonium salt of an interpolymer of 70% ethyl methacrylate and 30% of methacrylic acid, 150 parts of water and 130 parts of methyl alcohol are mixed with 600 parts of a 20% aqueous solution of lactic acid casein and then 10 parts of linseed oil are stirred into the mixture. It is diluted with about 9000 parts of water, whereby a dressing solution, ready for spraying, is obtained which is sprayed onto a leather which has already been coated with a body color on the basis of known water-soluble binding agents. A leather is obtained which after buff-polishing has extremely good fastness against dry and wet rubbing.

Example 3

An aqueous solution of a body color which contains per litre 24.0 grams of casein, 4.2 grams of borax, 12.0 grams of Turkey red oil, 38.0 grams of iron oxide red (Schultz, Farbstofftabellen, 7th edition, volume 1, No. 1429) as well as 20.0 grams of a solution of equal parts of an interpolymer of 85% of ethyl methacrylate and 15% of acrylic acid, ethyl alcohol and water, is applied to the grain side of a chrome-tanned, pre-dyed kid leather. After the usual dressing and fixing, there is obtained a finish which has a considerably more natural appearance than when the treatment is carried out without the last-mentioned addition.

What we claim is:

1. A process for coating leather which comprises coating the leather with a solution of an ammonium salt of carboxyl groups containing polymer of an acrylic ester having the general formula

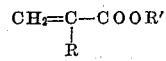

wherein R stands for a member selected from the class consisting of hydrogen and a methyl group and R' stands for a member selected from the class consisting of hydrogen and an alkyl radical having from 1 to 4 carbon atoms, these polymers having in

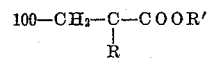

groups from 95 to 65 carboxyl ester groups and from 5 to 35 unesterified carboxyl groups and being dissolved in a mixture of water and an organic solvent miscible with water selected from the class consisting of monohydric alcohols having from 1 to 3 carbon atoms, water miscible ketones and ethers, using in this mixture from 60 to 150 parts of the organic water miscible solvent for each 100 parts of the polymer salt.

2. A process as claimed in claim 1 wherein the said solutions are used in admixture with aqueous solutions of colloids of the class of casein, egg albumen, blood albumen, tragacanth, carragheen moss extract, linseed slime and alginates.

3. A process as claimed in claim 1 wherein the said solutions are used in admixture with leather body colors.

4. A process as claimed in claim 1 wherein drying oils are added.

References Cited in the file of this patent

UNITED STATES PATENTS

| | | |
|---|---|---|
| 2,126,321 | Freudenberg | Aug. 9, 1938 |
| 2,557,266 | Dittmar | June 19, 1951 |